United States Patent
Kanjo

(10) Patent No.: US 8,381,886 B2
(45) Date of Patent: Feb. 26, 2013

(54) RELEASE HOLDING MECHANISM FOR RAILCAR HAND BRAKE

(75) Inventor: Wajih Kanjo, Homer Glen, IL (US)

(73) Assignee: WABTEC Holding Corp, Wilmerding, PA (US)

( * ) Notice: Subject to any disclaimer, the term of this patent is extended or adjusted under 35 U.S.C. 154(b) by 881 days.

(21) Appl. No.: 12/075,763

(22) Filed: Mar. 13, 2008

(65) Prior Publication Data

US 2008/0223669 A1    Sep. 18, 2008

Related U.S. Application Data

(60) Provisional application No. 60/918,523, filed on Mar. 16, 2007.

(51) Int. Cl.
*F16D 65/14*    (2006.01)
*F16D 65/56*    (2006.01)

(52) U.S. Cl. .................. 188/196 BA; 188/107

(58) Field of Classification Search ........... 74/505–507, 74/552, 556; 188/124, 130, 196 B, 196 BA, 188/106, 107, 106 P, 33
See application file for complete search history.

(56) References Cited

U.S. PATENT DOCUMENTS

| 3,258,991 | A | * | 7/1966 | Bezlaj ............................ 74/505 |
| 4,291,793 | A |   | 9/1981 | Klasing |
| 4,368,648 | A |   | 1/1983 | Housman et al. |
| 6,364,428 | B1 | * | 4/2002 | Labriola et al. .................. 303/13 |
| 7,093,694 | B2 | * | 8/2006 | Brandt et al. ............ 188/1.11 R |
| 2005/0279184 | A1 | * | 12/2005 | Sommerfeld et al. .......... 74/552 |

FOREIGN PATENT DOCUMENTS

EP    1459953    3/2004

* cited by examiner

*Primary Examiner* — Bradley King
*Assistant Examiner* — Vishal Sahni
(74) *Attorney, Agent, or Firm* — James Ray & Assoc

(57) ABSTRACT

A release holding mechanism for a railcar hand brake includes a release shaft rotatably mounted in the housing. A quick release handle is rigidly secured to an external end of the release shaft for rotation therewith and manually rotatable into a release position to initiate the quick release of the railcar brake application. A release lever cooperates with a driving mechanism of the hand brake to effect quick release of the railcar brake application. A release ratchet wheel is mounted for rotation with the driving mechanism. A release pawl operably engages the release ratchet wheel when the driving mechanism rotated for releasing the brake application. A gravity weighted member is disposed on and rigidly secured to the release lever for maintaining the release pawl, due to gravity, in a disengaged position relative to the release ratchet wheel when the driving mechanism is manually operable for effecting the brake application.

16 Claims, 6 Drawing Sheets

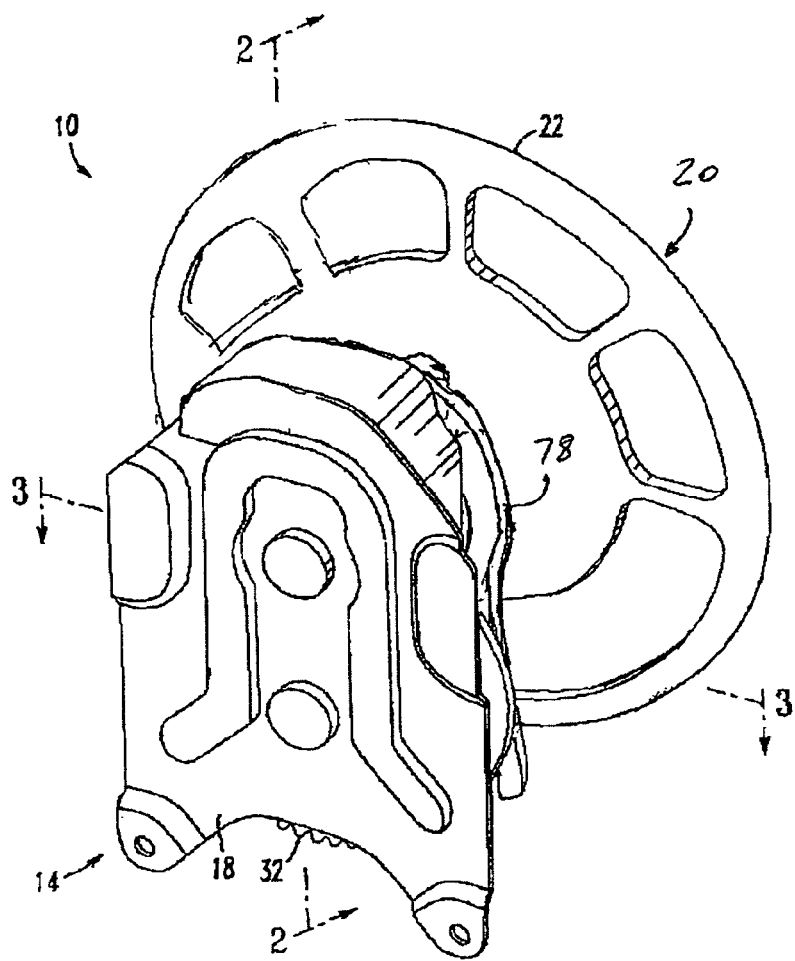
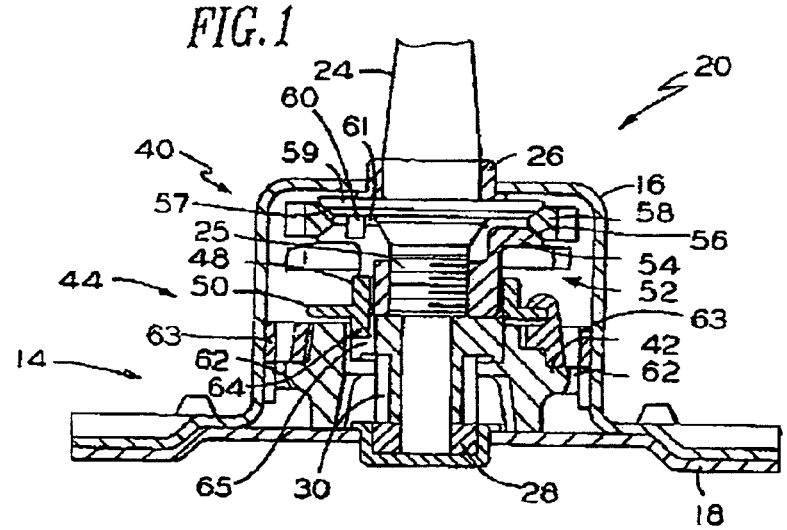
FIG. 3

RELEASE HOLDING MECHANISM FOR RAILCAR HAND BRAKE

CROSS-REFERENCES TO RELATED APPLICATION

This application is related to and claims priority from Provisional Patent Application Ser. No. 60/918,523 filed on Mar. 16, 2007.

FIELD OF THE INVENTION

The present invention relates, in general, to hand brakes for railroad cars and, more particularly, this invention relates to a hand brake equipped with a quick release mechanism and, yet more particularly, the instant invention relates to a hand brake having a release holding mechanism for maintaining the hand brake and the railcar brakes in a released position after use of the quick release mechanism.

BACKGROUND OF THE INVENTION

Railway car hand brake mechanisms are well known in the art. They usually include a relatively large, rotatable hand wheel disposed in a vertical plane and mounted on a shaft which, through a gear train, can rotate a chain drum to wind up a chain that is secured at its end remote from the chain drum to the brake rigging of the railway car. As the hand wheel is rotated in one direction, the brakes are applied and rotation of the hand wheel shaft in the opposite direction is prevented by a holding pawl which engages a ratchet wheel on the hand wheel shaft.

One type of such hand brake mechanisms further includes a clutch mechanism for facilitating gradual release of the brake. When a hand wheel is rotated clockwise (as viewed from the front of the unit), such rotation is transmitted directly through a drive shaft, a pinion, a gear, and a winding drum to take up slack of a chain connected to the brake rigging. When resistance is offered by the chain to further rotation of the hand wheel, such resistance, acting back through the drum, the gear, and pinion, causes a nut to be advanced on a threaded portion of the drive shaft to move against a ratchet member which is clamped between respective friction surfaces on the nut and on the drive shaft, thus causing the drive shaft, ratchet wheel, and the nut to rotate as a unit. The pawl prevents rotation of the ratchet wheel in the opposite direction. The hand wheel torque is increased until a state of static equilibrium is reached, or at the point at which the brakes are fully applied, whereupon rotation of the hand wheel is terminated, and the clamped ratchet wheel, by means of the holding pawl, prevents the chain from unwinding.

The clutch mechanism also provides for quick release of the brakes by on the hand brakes equipped with a quick release handle. Manually rotating the quick release handle, generally in a clockwise direction as viewed from the front of the hand brake, effects disengagement of the normally engaged clutch and thereby allows free rotation of the pinion and gear to release the chain load while the nut and ratchet wheel are held stationary by the holding pawl. The brakes may also be released by disengaging the holding pawl from the detent wheel but this causes rapid rotation of the hand wheel and the gears of the gear train.

To avoid rapid rotation of the hand wheel, hand brake mechanisms have been devised which are known as "quick release" mechanisms. U.S. Pat. No. 4,368,648 issued to Housman et al. and entitled "Hand Brake for Railroad Car" teaches such hand brake having a quick release mechanism. The quick release mechanism includes a releasable connecting means between the hand wheel shaft and the gear train. When the connecting means is released, the gears of the gear train rotate rapidly, without constraint by the holding pawl and ratchet wheel, but the hand wheel remains stationary. The teachings of U.S. Pat. No. 4,368,648 are hereby incorporated in present application by reference thereto.

It has been found that when a hand brake is quick released using the quick release handle, the releasable connecting means between the hand wheel shaft and the gear train may not remain in released position due to the vibration or other unknown energy generated during train operation. As the result the railcar brakes may be applied unintentionally during railcar motion when the chain of the hand brake does not have enough slack to overcome partial release or the chain. It has been further found that some operators do not sufficiently hold the quick release handle in the released position to enable full release of the brakes.

It has also been found that many railroads object to the quick release handle being left in the released position and require for such handle to be returned due to gravity into the applied position while maintaining the railcar brakes in the released condition.

Therefore, there is a need for a release holding mechanism for use in a hand brake that prevents at least partial unintentional re-application of the railcar brakes and allows the return of the quick release handle into the initial applied position while maintaining the railcar brakes in the released condition.

SUMMARY OF THE INVENTION

According to one aspect, the present invention provides a release holding mechanism for a railcar hand brake connected by a chain to a railcar brakes. The hand brake has a housing. A manually operable driving means is connected to the chain and rotatable in one direction and upon buildup of tension on the chain during take-up thereof for effecting a railcar brake application. The manually operable driving means is rotatable in an opposed direction for releasing the railcar brake application. The release holding mechanism is provided and includes a release shaft rotatably mounted in the housing. A quick release handle is rigidly secured to an external end of the release shaft for rotation therewith and manually rotatable into a release position to initiate the quick release of the railcar brake application. A release lever then cooperates with the driving means to effect quick release of the railcar brake application. There is also provided a release ratchet wheel which is mounted for rotation with the driving means. A release pawl is mounted adjacent the release ratchet wheel and has a tooth engaging portion formed on one end thereof for operably engaging teeth of the release ratchet wheel when the quick release handle is rotated for releasing the brake application. A gravity weighted means is disposed on and rigidly secured to the release lever for maintaining the release pawl, due to gravity, in a disengaged position relative to the release ratchet wheel when the driving means is manually operable for effecting the brake application.

According to another aspect of the invention, there is provided an improvement to a hand brake mechanism for a railroad car, where a hand wheel is used to rotate a gear wheel to apply the railcar brakes, having a housing with a back wall and a front wall, with a chain winding drum and a main gear wheel rotatably mounted on a drum shaft thereon, a drive shaft rotatably mounted on the housing having a bearing section at a first end and a hand wheel receiving section on a second end external to the housing, a ratchet wheel rotates with the drive shaft intermediate the first and second ends thereof, a holding pawl mounted in the housing and cooperating with the ratchet wheel so as to prevent reverse rotation thereof, a pinion freely rotatable on the drive shaft and engaging the main gear wheel, the pinion having a radially extending flange cooperating therewith, a disengageable driving connection means between the flange and the ratchet wheel, a clutch collar rotatably engaged with the pinion and frictionally engaging the ratchet wheel, an annular stationary cam member secured in fixed coaxial surrounding relation to the drive shaft adjacent to an end thereof to which the pinion is secured, an annular movable cam disposed coaxially with and in surrounding relation to the stationary cam and being connected therewith by complementary fast pitch threads formed partly on the stationary cam and partly on the movable cam, a quick release mechanism having a release shaft rotatably mounted in the housing and a quick release handle disposed on and secured to an external end of the release shaft, the quick release mechanism cooperates with the holding pawl which is rotatably supported on the release shaft to allow reverse rotation of the ratchet wheel for releasing the chain. The improvement includes a release ratchet wheel formed on a peripheral edge of the clutch collar. A release lever is provided and includes a body and a bore formed through the body for pivotally mounting the release lever on the release shaft. A flange is formed on exterior surface of the body and extends outwardly therefrom in a plane perpendicular to a longitudinal axis of the bore. The flange has a first surface and an opposed second surface. A pin is formed on the first surface of the flange adjacent a bottom edge thereof and extends outwardly from the first surface and coaxially with the bore. There is a threaded aperture which is formed through the flange adjacent the bottom edge thereof and coaxially with the pin. A force receiving portion is formed on the body. A first stop portion is formed on the flange and a gravity weighted portion is formed on the body and radially opposes the force receiving portion. A release pawl is also provided and has a tooth engaging portion formed on one end thereof for operably engaging teeth of the release ratchet wheel and a second stop portion formed on an opposed end thereof. There is means for pivotally attaching the release pawl to the release lever. A force transmitting means is disposed on and secured to a peripheral surface of the release shaft for transmitting a force generated by a rotation of the quick release handle. In operation, the rotation of the quick release handle in a first direction, from applied position into a release position in order to effect a quick release of the hand brake causes a rotation of the release shaft in the first direction, an engagement of the force transmitting means with the force receiving portion formed on the release lever, a rotation of the release lever in the first direction, an engagement of the tooth engaging portion of the release pawl with the teeth of the release ratchet wheel. The rotation of the quick release handle also causes engagement of the pin with a first fork of the movable cam of the clutch collar for rotating the movable cam in the second direction and effecting axial movement thereof via the fast pitch threads and engagement thereof with a flange formed on the clutch collar for operating the clutch collar to a disengaged position from the pinion, so that the pinion may rotate freely for releasing a load on the chain and for enabling the quick release of the railcar brakes. Further, rotation of the quick release handle in an opposed second direction into the applied position holds the brakes in a released condition. Finally, rotation of the hand wheel to apply brakes causes a rotation of the release ratchet wheel in the first direction, a disengagement of the tooth engaging portion of the release lever from engagement with the teeth of the release ratchet wheel, and a rotation of the release lever in the second direction due to gravity effected by the gravity weighted portion thereof.

According to yet another aspect, the invention provides a hand brake including a chain connectable at one end to a railcar brakes. The hand brake includes a chain drum by which the chain may be either taken up for effecting a brake application when rotated in one direction or let out for releasing the brake application when rotated in an opposite direction. A manually operable driving means is connected to the chain drum and rotatable in one direction or an opposite direction for causing rotation of the chain drum into the one or the opposite direction, respectively. The driving means includes a drive shaft having a screw-threaded portion, a hand wheel secured at one end of the drive shaft and a pinion secured at the opposite end of the drive shaft for rotation therewith upon rotation of the hand wheel. A clutch and release mechanism is cooperatively connected with the driving means and operable upon rotation thereof in the one direction and upon buildup of tension on the chain during take-up thereof for effecting a brake application, to an engaged disposition in which the driving means is constrained from rotation in the opposite direction and thereby maintaining the railcar brake application until released, the clutch and release mechanism including ratchet means rotatable along with the driving means and cooperative with a holding pawl, upon termination of manual effort on the driving means for retaining the driving means and the railcar brake application in a state of equilibrium, the clutch and release mechanism further including a clutch collar rotatably engaged with the pinion, a splined nut rotatable on the drive shaft for clamping the ratchet wheel during railcar bake application, an annular stationary cam member secured in fixed coaxial surrounding relation to the drive shaft adjacent to the end to which the pinion is secured, an annular movable cam disposed coaxially with and in surrounding relation to the stationary cam and being connected therewith by complementary fast pitch threads formed partly on the stationary cam and partly on the movable cam. A quick release mechanism is provided and cooperates with the clutch and release mechanism. The quick release mechanism includes a release shaft mounted for rotation above the clutch and release mechanism. A quick release handle is rigidly secured to an external end of the release shaft for rotation therewith and manually rotatable from an initial applied position into a release position to initiate a quick release of the chain and subsequently to initiate a quick release of the railcar brakes. A release lever is connected to the movable cam. The release lever effective, upon rotation in the one direction, for rotating the movable cam and effecting axial movement thereof via the fast pitch threads, the clutch collar having a flange formed thereon engageable by the movable cam during axial movement of the latter for operating the clutch collar to a disengaged position from the pinion, so that the pinion is disconnected from the driving means and may rotate freely to effect the quick release of the brakes. A release holding means is also provided and cooperates with the quick release mechanism to hold the railcar brakes in the released condition when the quick release handle is returned into the initial applied position.

OBJECTS OF THE INVENTION

It is, therefore, one of the primary objects of the present invention to provide a hand brake for a railcar.

Another object of the present invention is to provide a hand brake which employs a quick release mechanism.

Yet another object of the present invention is to provide a release holding mechanism for maintaining the railcar brakes in a released condition after use of the quick release handle of such quick release mechanism.

A further object of the present invention is to provide a release holding mechanism for maintaining the railcar brakes in a released condition while allowing the quick release handle to return into the applied position due to gravity.

Yet a further object of the present invention is to provide a release holding mechanism for maintaining the railcar brakes in a released condition after use of the quick release mechanism that can be retrofitted on the hand brakes presently in use.

An additional object of the present invention is to provide a release holding mechanism for maintaining the railcar brakes in a released condition that is economical to manufacture.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE DRAWINGS

FIG. 1 is a rear isometric view of a hand brake assembly of the present invention;

FIG. 3 is a cross-sectional view of the hand brake assembly, taken along the lines 3-3 of FIG. 1, particularly depicting a clutch and release mechanism of the present invention;

BRIEF DESCRIPTION OF THE VARIOUS EMBODIMENTS OF THE INVENTION

Figure 2:
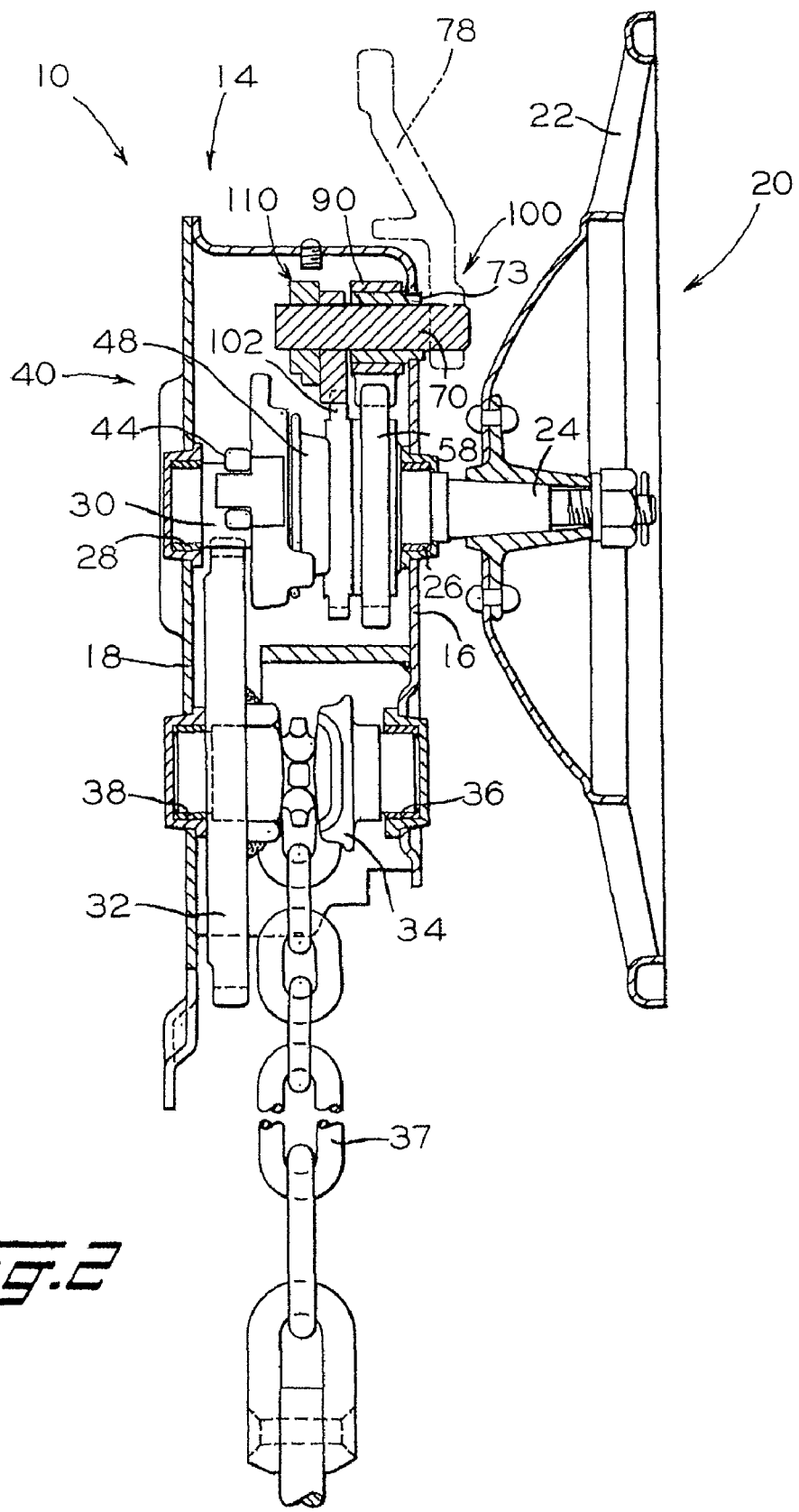
FIG. 2 is a cross-sectional view of the hand brake assembly, taken along the lines 2-2 of FIG. 1 and also showing a chain component.

Prior to proceeding to the more detailed description of the present invention, it should be noted that, for the sake of clarity and understanding, identical components which have identical functions have been identified with identical reference numerals throughout the several views illustrated in the drawing figures.

The best mode for carrying out the invention is presented in terms of its presently preferred embodiment, herein depicted within FIGS. 1 through 7. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

Now in a particular reference to FIGS. 1-3, therein is illustrated a hand brake for railroad cars embodying the invention, generally designated as 10. The hand brake 10 comprises housing, generally designated as 14, having a front plate 16 and a back plate 18. A driving mechanism, generally designated as 20, is disposed in the upper portion of housing 14 and includes a hand wheel 22 which is disposed on and secured to one end of a drive shaft 24 being journaled for rotation in bearings 26 and 28 secured in the front plate 16 and back plate 18, respectively.

A pinion 30 is secured to the drive shaft 24 for rotation therewith at the end adjacent bearing 28. The pinion 30 operatively engages a gear 32 for rotating a chain drum 34 journaled for rotation in bearings 36 and 38 secured on the front plate 16 and back plate 18, respectively, in the lower portion of the housing 14. Chain drum 34 engages alternate links of a chain 37 for either taking-up or letting-out the chain 37.

Also disposed in the upper portion of the housing 14 and associated with the driving mechanism 20, is a clutch and quick release mechanism, generally designated as 40, which may best be seen in FIG. 3-6. The clutch and quick release mechanism 40 includes an annular stationary cam member 42 restrained from both axial and rotational movement, and a movable cam member, generally designated as 44, rotatably and concentrically disposed within the stationary cam member 42. The movable cam member 44 is rotatable relative to the stationary cam member 42 by means of complementary fast pitch threads 43 formed thereon.

An internally splined annular clutch collar 48 is provided with an annular flange 50 and concentrically surrounds the drive shaft 24, the collar engaging with an externally splined nut, generally designated as 52, which is attached to the threaded portion 25 of the drive shaft 24. Nut 52 has a flange 54 with an annular friction surface 56 for making abutting contact with one side of a ratchet wheel 58, while the other side of the ratchet wheel 58 operatively abuts a friction surface 57 of a friction plate 59 concentrically secured to the drive shaft 24 adjacent the bearing 26.

Figure 4:
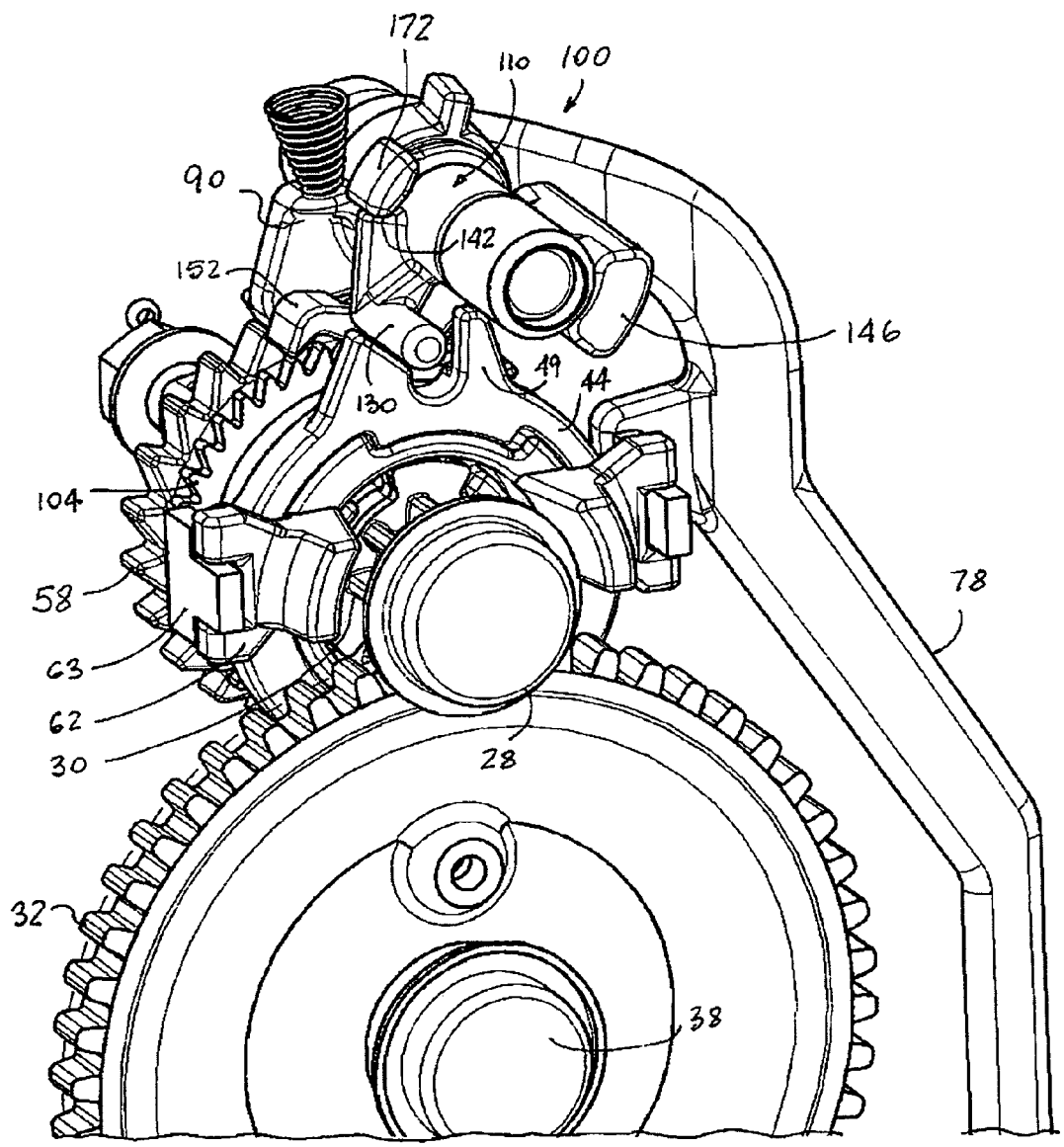
FIG. 4 is a partial rear isometric view of the hand brake of FIG. 1, particularly showing a release holding mechanism of the present invention in a position for allowing application of the railcar brakes.

A holding pawl 90 is provided and engages the ratchet wheel 58 and is free to ratchet thereon upon rotation of the ratchet wheel 58 in a counter-clockwise direction, as viewed in FIG. 4.

In further reference to FIGS. 4-7, a quick release mechanism is provided and includes a release shaft 70 which is journaled in a release shaft bushing 73 perpendicularly secured in the front plate 16 above the driving mechanism 20. A quick release handle 78 is disposed on and secured to an external end of release shaft 70 in a conventional fashion, for example, such as by welding. The release handle 78 may be any one of the presently employed release handles and its detail description will be omitted for the sake of brevity. Advantageously, the holding pawl 90 is rotatably mounted on the release shaft 70 by way of a bushing 75.

A release holding mechanism, generally designated as 100, is provided for maintaining the railcar brakes in the released condition and for preventing unintended reapplication of the railcar brakes during motion.

Figure 7:
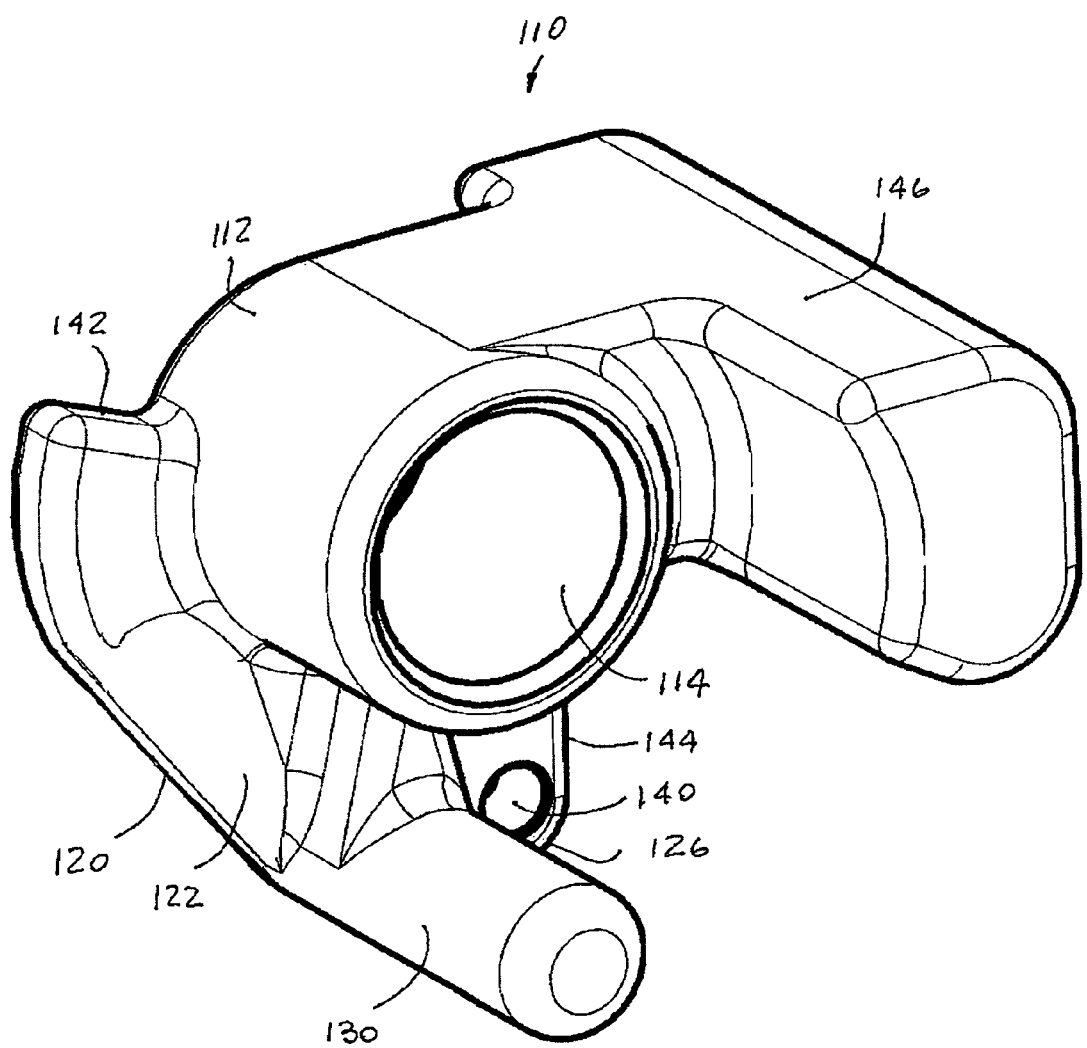
FIG. 7 is a front isometric view of a release lever employed in the release holding mechanism of the present invention.

In accordance with a presently preferred embodiment of the invention, the release holding mechanism 100 includes a release ratchet wheel 102 formed by a plurality of ratchet teeth 104 on a peripheral edge of the flange 54 of the nut 52. A release lever, generally designated as 110, and preferably of a unitary construction, as best illustrated in FIG. 7, is also provided and includes a body 112 and a bore 114 formed through the body 112 for pivotally mounting the release lever 110 on the release shaft 70. The body has a generally cylindrical shape. A flange 120 is formed on an exterior surface 116 of the body 112 and extends outwardly and radially therefrom. The flange 120 has a first surface 122 and an opposed second surface 124. There is a pin 130 which is formed on the first surface 122 of the flange 120 and adjacent a bottom edge 126 thereof. The pin 130 extends outwardly from the first surface 122 and coaxially with the bore 114. Preferably, the pin 130 has a cylindrical shape. A threaded aperture 140 is formed through the flange 120 adjacent the bottom edge 126 thereof and coaxially with the pin 130. A force receiving portion is also formed on the body 110. Preferably, such force receiving portion is a top edge 142 of the flange 120. A first stop portion is formed on the flange 120 by way of its side edge 144. The final essential element of the release lever 100 is a gravity weighted portion 146 disposed on the body 112 radially opposing the force receiving portion 142 for aiding operation of the release holding mechanism due to effect of gravity. Such gravity weighted portion 146 may be rigidly secured to the body 112 for example, by a welding process, or by use of fasteners (not shown) and, preferably, the gravity weighted portion 146 formed integrally with the body 112. The presently preferred weight of the release lever 110, including the gravity weighted portion 146, is about 1.5 pounds.

The release holding mechanism 100 further includes a release pawl 150 having a tooth engaging portion 152 formed on one end thereof for operably engaging teeth 104 of the release ratchet 102 and a second stop portion 154 formed on an opposed end thereof and extending generally perpendicular to the surface of the release pawl 150. There is also means for pivotally attaching the release pawl 150 to the release lever 120. In the presently preferred embodiment of the invention, the pivotally attaching means includes the threaded aperture 140 formed through the flange 120 adjacent the bottom edge 126 thereof and coaxially with the pin 130, an aperture 164 formed through the release lever 150 intermediate ends thereof and a threaded fastener 166, such as a conventional shoulder screw, having a shoulder portion thereof positioned within the aperture 166 formed in the release pawl 150 and having a threaded end thereof operably engaging the threaded aperture 140 formed in the release lever 110. When the quick release handle 78 is disposed in the initial applied position, the tooth engaging portion 152 is prevented from engaging the teeth 104 of the release ratchet 102 due to the stop portion 154 abuttingly engaging the edge 144 of the release lever 110.

The final essential element of the release holding mechanism 100 is a force transmitting means disposed on and secured to a peripheral surface of the release shaft 70 for transmitting a force generated by a manual rotation of the quick release handle 78. Such force transmitting means includes a radially extending annular flange 170 and a tab 172 disposed on the flange 170 generally parallel to the release shaft 70. When the quick release handle 78 is disposed in the initial applied position, the top edge 142 abuts the tab 172.

Figure 5:
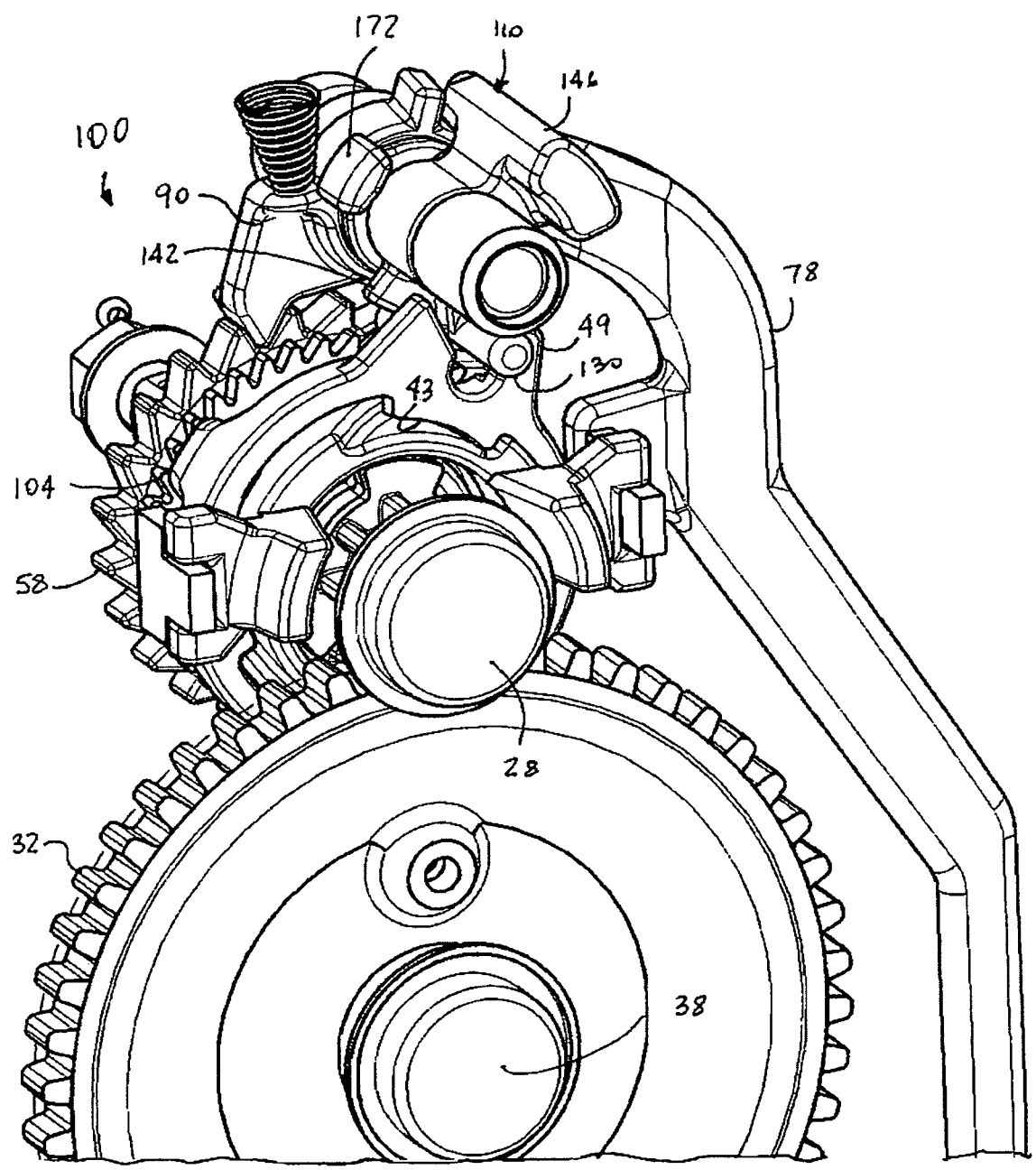
FIG. 5 is a partial rear isometric view of the hand brake assembly FIG. 1, particularly showing the release holding mechanism of the present invention in a position for maintaining release of the railcar brakes.
Figure 6:
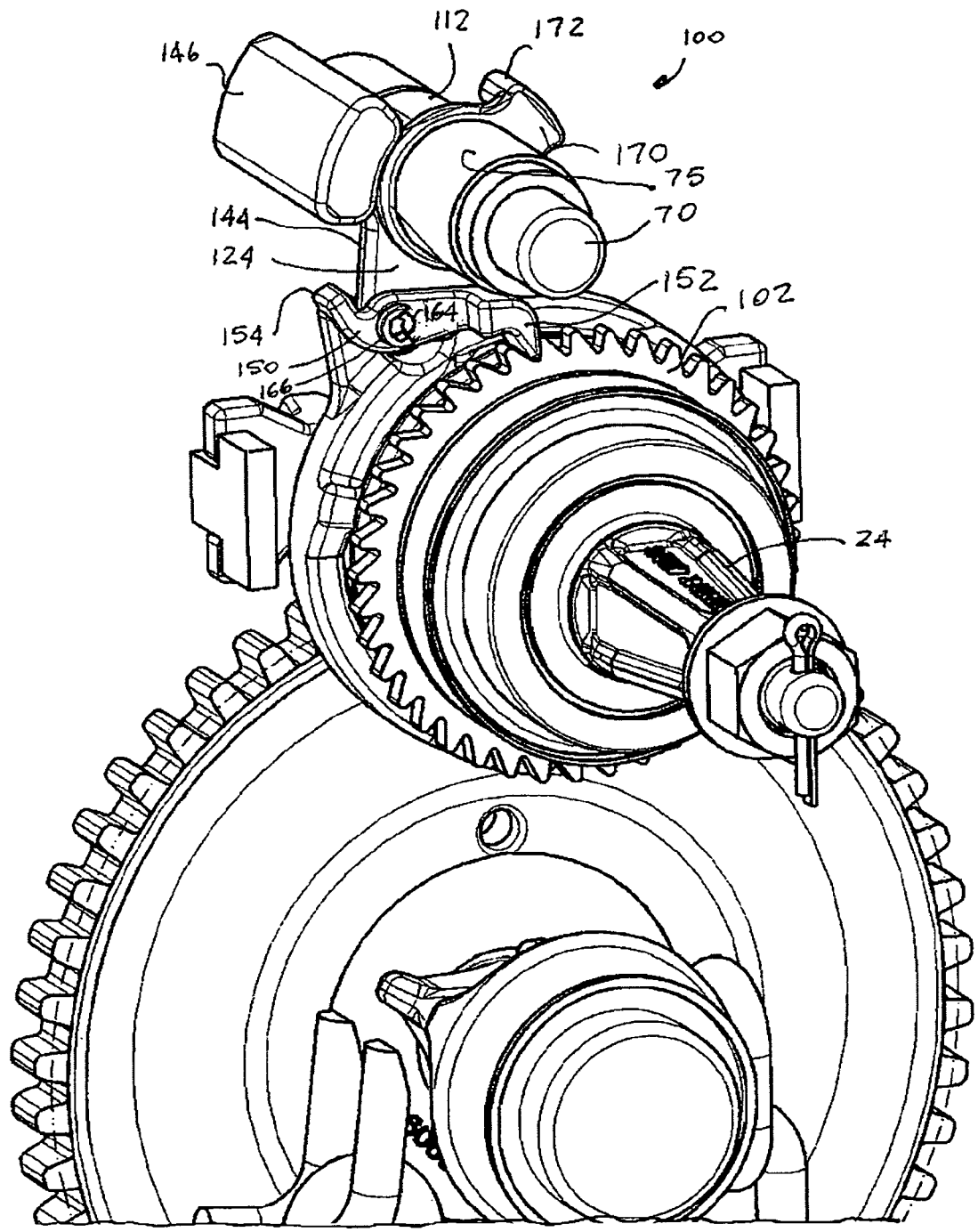
FIG. 6 is a partial front isometric view of the hand brake assembly of FIG. 5.

In operation, in order to apply the railcar brakes, the hand wheel 22 is rotated in a counter-clockwise direction, as viewed in FIGS. 1 and 4-5, and such rotation is transmitted through the drive shaft 24 and the pinion 30 to cause rotation of the gear 32 in the clockwise direction and thereby take-up slack of the chain 37. Until such time that tension starts to build up in the chain 37, drive shaft 24, pinion 30, nut 52, and clutch collar 48 all rotate as a unit during rotation of the hand wheel 22. When tension begins to build up in the chain 37, such tension is reflected in the gear 32 and is transmitted back through the pinion 30 to the clutch collar 48. Resistance to rotation by the clutch collar 48, which is splined to the nut 52, causes the nut 52 to advance on threads and thereby clamp the ratchet wheel 58 between friction surfaces 56 and 57. With the ratchet wheel 58 so clamped, continued rotation of the hand wheel 22 causes the drive shaft 24, the ratchet member 58, and the nut 52 (along with friction plates 59) to rotate as a single unit until the desired tension is attained on the chain 37, while the holding pawl 90 ratchets on the ratchet wheel 58. When the desired tension has been achieved on chain 37, rotation or application of torque on the hand wheel 22 is terminated, and the holding pawl 90 engaged on clamped ratchet wheel 58 prevents the chain 37 from unwinding, since the holding pawl 90 permits only counter-clockwise rotation of the ratchet wheel 58.

Once applied, the brakes may be released either gradually or quickly.

For providing a gradual release of the brakes, the hand wheel 22 is turned clockwise slightly, as viewed in FIGS. 1 and 4-5, to partially loosen the nut 52 and thereby reduce the clamping force on the ratchet wheel 58, which is restrained from rotation by the holding pawl 90. The initial clockwise rotation of the hand wheel 22 effects a corresponding rotation of the pinion 30 and the gear 32, thereby easing tension on the chain 37. Continued clockwise rotation of the hand wheel 22 effects complete release of the load on the chain 37 with the gear 32 continuing to rotate until the winding drum 35 has taken up all chain slack, that is, the amount of chain that had been taken up during the brake-applying phase of operation. When all chain slack has been taken up, further rotation of gear 32, pinion 30 and nut 52 is terminated with the brakes being fully released. Counter-clockwise rotation of the hand wheel 22 is limited by a drive shaft pin 60 which projects into a slot 61 formed in nut 52.

A quick release of the railcar brake application is caused by rotating the quick release handle 78 (which is normally disposed in an applied position) in a counter-clockwise direction, as viewed in FIGS. 1 and 4-5 into a release position. Such rotation of the quick release handle 78 causes like rotation of the release shaft 70 and further causes the engagement of the force transmitting portion 172 with the force receiving portion 142 formed on the flange 120 of the release lever 110, rotation of the release lever 110 in the counter-clockwise direction and engagement of the tooth engaging portion 152 of the release pawl 154 with the teeth 104 of the release ratchet wheel 102.

Subsequently, to the engagement of the tooth engaging portion 152 of the release pawl 154 with the teeth 104 of the release ratchet wheel 102, the pin 130 engages the fork portion 49 of the movable cam 44 and rotates the movable cam 44 in a clockwise direction. As was hereinbefore noted, stationary cam 42 and movable cam 44 are provided with complementary fast-pitch threads 43, so that as movable cam 44 rotates clockwise, it moves axially outwardly of the stationary cam 42, in an upwardly direction as viewed in FIG. 3, and carries with it clutch collar 48 to a disengaged position from the pinion 30 by engagement of the collar flange 50 thereof. A groove (not shown) in the movable cam 44 serves to constrain the collar flange 50 from relative axial and lateral movement with respect to the movable cam 44 but allows free clutch collar 48 rotation. Stationary cam 42 is restrained against both rotational and axial movement by engagement of lugs 62 formed on the periphery thereof and engaged in respective T-shaped elements 63 fixed to the inside surface of the housing 14 (see FIG. 3). Thus, upward axial movement of the movable cam 44 causes axial disengagement of external splines 64 formed on clutch collar 48 from internal splines 65 formed on the pinion 30, thereby allowing pinion 30 and gear 32 to disconnect from the driving mechanism and rotate freely for releasing the load on chain 37, while drive shaft 24, nut 52, collar 48, and ratchet wheel 58 are all held stationary by holding pawl 90.

Because, the release lever 110 is pivotally mounted on the release shaft 70, returned rotation of the quick release handle 78 in the clockwise direction, as viewed in FIGS. 1 and 4-5, into the applied position holds the railcar brakes in the released condition.

When the hand wheel 22 is rotated to apply railcar brakes, the rotation of the drive shaft 24 causes rotation of the release ratchet wheel 102 in the counter-clockwise direction and further causes the tooth engaging portion 152 of the release lever 150 to ride up on the tooth 104 and essentially disengage therefrom. When the tip of the tooth engaging portion 152 reaches the tip of the tooth 104, the load is removed from the tooth engaging portion 152 enabling the gravity weighted portion 146 to rotate the release lever 110 in the clockwise direction as viewed in FIG. 4. The rotation of the release lever 110 prevents the release pawl 150 from reengaging the release ratchet wheel 102 by way of its stop portion 154 abutingly engaging the edge 144 of the release lever 110 and positions the release holding mechanism 100 for subsequent release of the railcar brakes. The rotation of the release lever 110 stops when the top edge 142 of the flange 120 abuts the second portion 172 of the force transmitting means, as best shown in FIG. 4.

It will be appreciated from the above description that when operator releases the quick release handle 78 and allows it to return by gravity back into the applied position, the release holding mechanism 100 maintains the railcar brakes in a released condition thus preventing at least partial unintended re-application of the brakes and alleviating difficulties experienced with a conventional quick release mechanisms.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. A release holding mechanism for a railcar hand brake connected by a chain to railcar brakes, said hand brake having a housing, a manually operable driving means including a ratchet wheel and a holding pawl cooperating with the ratchet wheel, the manually operable driving means connected to the chain and rotatable in one direction and upon buildup of tension on the chain during take-up thereof for effecting a railcar brakes application, the manually operable driving means rotatable in an opposite direction for releasing the railcar brakes application, said release holding mechanism comprising:
    (a) a release shaft mounted for rotation within the housing;
    (b) a quick release handle rigidly secured to an external end of the release shaft for rotation therewith, said quick release handle manually rotatable in said one direction into a release position to initiate the quick release of the railcar brakes application;
    (c) a release lever mounted for rotation on said release shaft and cooperating with the driving means to effect quick release of the railcar brakes application;
    (d) a release ratchet wheel mounted adjacent to and coaxially with the ratchet wheel for rotation with the manually operable driving means;
    (e) a tooth engaging portion being in operative engagement with teeth of said release ratchet wheel when said manually operable driving means is rotated for releasing the brake application; and
    (f) a gravity weighted means disposed on and rigidly secured to said release lever, said gravity weighted means maintaining said tooth engaging portion, due to gravity, in a disengaged position relative to said release ratchet wheel when said driving means is manually operable in said one direction for effecting the railcar brakes application.

2. The release holding mechanism, according to claim 1, wherein said gravity weighted means is formed integral with said release lever.

3. The release holding mechanism, according to claim 1, wherein said release lever includes a pin engaging one fork of a movable cam of a clutch collar of the driving means for rotating the movable cam in the opposed direction and effecting axial movement and engagement thereof with a flange formed on the clutch collar for operating the clutch collar to a disengaged position from a pinion of the drive means, so that the pinion may rotate freely for releasing a load on the chain and for enabling said quick release of the brake application.

4. The release holding mechanism, according to claim 1, wherein said release ratchet wheel is formed on a peripheral edge of a nut of the driving means.

5. The release holding mechanism, according to claim 1, wherein said mechanism includes a force transmitting member disposed on and secured to an exterior surface of said release shaft for rotation therewith and a force receiving member disposed on and secured to said release lever, whereby said manual rotation of said quick release handle to initiate said quick release of the railcar brakes application generates a force transmitted through said force transmitting member to said force receiving member upon engagement therewith to rotate said release lever and engage said tooth engaging portion with said release ratchet wheel.

6. A hand brake mechanism for railcar brakes, where a hand wheel is used to rotate a gear wheel to apply the railcar brakes, having a housing with a back wall and a front wall, with a chain winding drum and a main gear wheel rotatably mounted on a drum shaft thereon, a chain wrapped on said chain winding drum, a drive shaft rotatably mounted on said housing having a bearing section at a first end and a hand wheel receiving section on a second end external to said housing, a ratchet wheel rotatable with said drive shaft intermediate said first and second ends thereof, a splined nut rotatable on said drive shaft for clamping said ratchet wheel during railcar brakes application, a holding pawl mounted in said housing and cooperating with said ratchet wheel so as to prevent reverse rotation thereof, a pinion freely rotatable on said drive shaft and engaging said main gear wheel, said pinion having a radially extending flange cooperating therewith, a disengageable driving connection means between said flange and said ratchet wheel, a clutch collar rotatably engaged with said pinion and frictionally engaging said ratchet wheel, an annular stationary cam member secured in fixed coaxial surrounding relation to said drive shaft adjacent to an end thereof to which said pinion is secured, an annular movable cam disposed coaxially with and in surrounding relation to said stationary cam and being connected therewith by complementary fast pitch threads formed partly on said stationary cam and partly on said movable cam, a quick release mechanism having a release shaft rotatably mounted in said housing and a quick release handle disposed on and secured to an external end of said release shaft, said quick release mechanism cooperates with said holding pawl which is rotatably supported on said release shaft to allow reverse rotation of said ratchet wheel for releasing said chain, an improvement comprising:
(a) a release ratchet wheel formed on a peripheral edge of said splined nut adjacent to and coaxially with said ratchet wheel;
(b) a unitary release lever including:
  (i) a body,
  (ii) a bore formed through said body for pivotally mounting said release lever on said release shaft,
  (iii) a release flange formed on exterior surface of said body and extending outwardly therefrom in a plane perpendicular to a longitudinal axis of said bore, said release flange having a first surface and an opposed second surface,
  (iv) a pin formed on said first surface of said release flange adjacent a bottom edge thereof, said pin extending outwardly from said first surface and coaxially with said bore,
  (v) a force receiving portion formed on at least one of said release flange and said body,
  (vi) a first stop portion formed on said body, and
  (vii) a gravity weighted portion formed on said body and diametrically opposite said force receiving portion;
(c) a tooth engaging portion being in operative engagement with teeth of said release ratchet wheel;
(d) a force transmitting means disposed on and secured to a peripheral surface of said release shaft for transmitting a force generated by a manual rotation of said quick release handle;
(e) whereby rotation of said quick release handle in a first direction, from applied position into a release position, to initiate a quick release of said hand brake causes:
  (i) rotation of said release shaft in said first direction,
  (ii) engagement of said force transmitting means with said force receiving portion formed on said release lever,
  (iii) rotation of said release lever in said first direction,
  (iv) engagement of said tooth engaging portion with said teeth of said release ratchet wheel, and
  (v) engagement of said pin with a first fork of said movable cam of said clutch collar for rotating said movable cam in an opposite second direction and effecting axial movement thereof via said fast pitch threads and engagement thereof with a flange formed on said clutch collar for operating said clutch collar to a disengaged position from said pinion, so that said pinion may rotate freely for releasing a load on said chain and for enabling said quick release of the brakes;
(f) whereby rotation of said quick release handle in said opposite second direction into said applied position holds the railcar brakes in a released condition; and
(g) whereby rotation of said hand wheel to apply railcar brakes causes:
  (i) rotation of said release ratchet wheel in said first direction,
  (ii) disengagement of said tooth engaging portion from engagement with said teeth of said release ratchet wheel, and
  (iii) rotation of said release lever downwardly in said second direction due to gravity effected by said gravity weighted portion thereof.

7. A hand brake, including a chain connectable at one end to railcar brakes, said hand brake comprising:
(a) a chain drum by which said chain may be either taken up for effecting a brake application when rotated in one direction or let out for releasing the brake application when rotated in an opposite direction;
(b) manually operable driving means connected to said chain drum and rotatable in one direction or an opposite direction for causing rotation of said chain drum into said one or said opposite direction, respectively, said driving means including a drive shaft having a screw-threaded portion, a hand wheel secured at one end of said drive shaft and a pinion secured at the opposite end of said drive shaft for rotation therewith upon rotation of said hand wheel;
(c) a clutch and release mechanism cooperatively connected with said driving means and operable upon rotation thereof in said one direction and upon buildup of tension on said chain during take-up thereof for effecting a railcar brakes application, to an engaged disposition in which said driving means is constrained from rotation in said opposite direction and thereby maintaining the railcar brakes application until released, said clutch and release mechanism including ratchet means rotatable along with the driving means and cooperative with a holding pawl, upon termination of manual effort on the driving means for retaining said driving means and said railcar brakes application in a state of equilibrium, said clutch and release mechanism further including a nut for clamping said ratchet means during the brake application, a clutch collar rotatably engaged with said pinion, an annular stationary cam member secured in fixed coaxial surrounding relation to said drive shaft adjacent to the end to which said pinion is secured, an annular movable cam disposed coaxially with and in surrounding relation to said stationary cam and being connected therewith by complementary fast pitch threads formed partly on said stationary cam and partly on said movable cam;
(d) a quick release mechanism cooperating with said clutch and release mechanism, said quick release mechanism including:
  (i) a release shaft mounted for rotation above said clutch and release mechanism,
  (ii) a quick release handle rigidly secured to an external end of said release shaft for rotation therewith and manually rotatable from an initial applied position into a release position to initiate a quick release of said chain and subsequently to initiate a quick release of the brakes, and
  (iii) a release lever connected to said movable cam, said release lever effective, upon rotation in said one direction, for rotating said movable cam and effecting axial movement thereof via said fast pitch threads, said clutch collar having a flange formed thereon engageable by said movable cam during axial movement of the latter for operating said clutch collar to a disengaged position from said pinion, so that said pinion is disconnected from said driving means and may rotate freely to effect said quick release of the railcar brakes; and
(e) a release holding means cooperating with said quick release mechanism to hold the railcar brakes in said released condition when said quick release handle is returned into said initial applied position, said release holding means at least including a release ratchet wheel formed on a peripheral edge of said nut and disposed adjacent to and coaxially with said ratchet means.

8. The hand brake, according to claim 7, wherein said release holding means further includes:

(a) means for pivotally connecting said release lever to said release shaft;
(b) a tooth engaging portion being in operative engagement with teeth of said release ratchet wheel when said clutch collar operated into said disengaged position; and
(c) a gravity weighted means disposed on and rigidly secured to said release lever for maintaining said tooth engaging portion, due to gravity, in a disengaged position relative to said release ratchet wheel when said driving means is manually operable for applying the railcar brakes.

9. The hand brake, according to claim 8, wherein said gravity weighted means is disposed on and rigidly secured to said release lever.

10. A hand brake mechanism for railcar brakes, where a hand wheel is used to rotate a gear wheel to apply the railcar brakes, having a housing with a back wall and a front wall, with a chain winding drum and a main gear wheel rotatably mounted on a drum shaft thereon, a chain wrapped on said chain winding drum, a drive shaft rotatably mounted on said housing having a bearing section at a first end and a hand wheel receiving section on a second end external to said housing, a ratchet wheel rotatable with said drive shaft intermediate said first and second ends thereof, a splined nut rotatable on said drive shaft for clamping said ratchet wheel during railcar brakes application, said splined nut having a flange and a plurality of ratchet teeth disposed on a peripheral surface of said flange, a holding pawl mounted in said housing and cooperating with said ratchet wheel so as to prevent reverse rotation thereof, a pinion freely rotatable on said drive shaft and engaging said main gear wheel, said pinion having a radially extending flange cooperating therewith, a disengageable driving connection means between said flange of said pinion and said ratchet wheel, a clutch collar rotatably engaged with said pinion and frictionally engaging said ratchet wheel, an annular stationary cam member secured in fixed coaxial surrounding relation to said drive shaft adjacent to an end thereof to which said pinion is secured, an annular movable cam disposed coaxially with and in surrounding relation to said stationary cam and being connected therewith by complementary fast pitch threads formed partly on said stationary cam and partly on said movable cam, a quick release mechanism having a release shaft rotatably mounted in said housing and a quick release handle disposed on and secured to an external end of said release shaft, said quick release mechanism cooperates with said holding pawl which is rotatably supported on said release shaft to allow reverse rotation of said ratchet wheel for releasing said chain.

11. The hand brake mechanism of claim 10, wherein said quick release mechanism includes a tooth engaging portion being in operative engagement with said plurality of teeth disposed on said peripheral surface of said flange when said hand brake is used to release applied railcar brakes and a gravity weighted means disposed on and rigidly secured to said release shaft for maintaining said tooth engaging portion, due to gravity, in a disengaged position relative to said plurality of teeth when said hand brake is manually operable for effecting railcar brakes application.

12. The hand brake mechanism of claim 1, wherein said gravity weighted means includes a concave surface and a convex surface disposed concentrically with said release shaft.

13. The hand brake mechanism of claim 1, wherein said gravity weighted means includes an elongated portion disposed along a length of said release shaft.

14. The hand brake mechanism of claim 13, wherein said elongated portion includes a concave surface and a convex surface spaced apart from each other to define thickness of said elongated portion.

15. The hand brake mechanism of claim 13, wherein said gravity weighted means is adapted to rotate downwardly in said opposite direction.

16. The hand brake mechanism of claim 13, wherein said gravity weighted means extends from a surface of said release lever in a direction of said quick release handle.

* * * * *